July 16, 1929.

H. A. W. WOOD

DOUBLE DECK PRINTING PRESS

Re. 17,376

Original Filed Dec. 29, 1926 3 Sheets-Sheet 1

Witness
G. F. Wesson.

Inventor
Henry A. Wise Wood
By attorneys
Southgate & Fitzpatrick

July 16, 1929. H. A. W. WOOD Re. 17,376

DOUBLE DECK PRINTING PRESS

Original Filed Dec. 29, 1926 3 Sheets-Sheet 2

Inventor
Henry A. Wise Wood
By attorneys
Coulthyate & Harley

Witness
E. F. Mason

July 16, 1929. H. A. W. WOOD Re. 17,376
DOUBLE DECK PRINTING PRESS
Original Filed Dec. 29, 1926 3 Sheets-Sheet 3
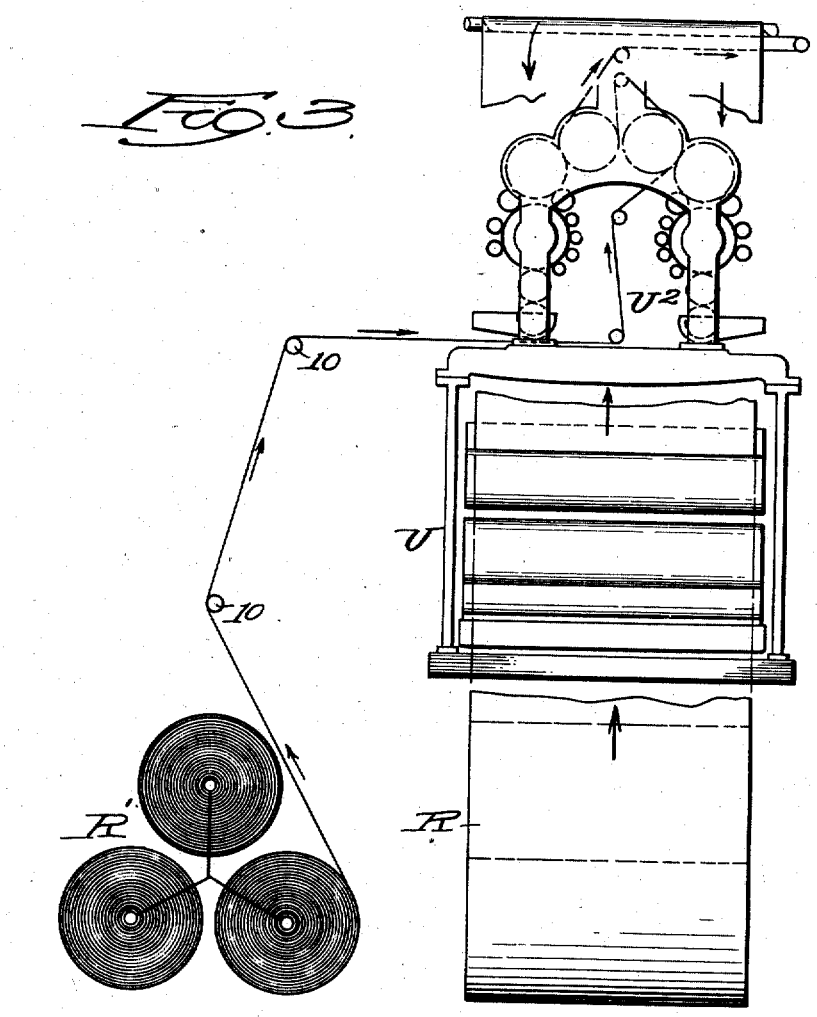
Inventor
Henry A. Wise Wood
By Attorneys
Soutter, Fay & Harley
Witness
E. F. Mason Reissued July 16, 1929. Re. 17,376

UNITED STATES PATENT OFFICE.

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA.

DOUBLE-DECK PRINTING PRESS.

Original No. 1,699,729, dated January 22, 1929, Serial No. 157,711, filed December 29, 1926. Application for reissue filed June 5, 1929. Serial No. 368,633.

This invention relates to a printing press in which there is one deck located above another. The principal objects of the invention are to provide a novel arrangement for the upper decks for the purpose of economizing in the space required for the web supply roll mechanisms and enabling them to be located in a more convenient and available place than has been the case heretofore and at the same time leading the webs to the upper decks without changing their direction and in a short path; also to avoid the necessity of locating the supply roll mechanism at the end of the series of decks of the press and to avoid the running of these webs throughout substantially the whole length of the press before they come to their printing units.

Other objects and advantages of the invention will appear hereinafter.

Reference is to be had to the accompanying drawings in which

Fig. 3 is an end view of the press showing also the path of the web from the supply roll to the upper deck.

Printing press units are arranged, if possible, on the floor level, one beside another with a paper supply directly underneath them on a lower level, ordinarily called the reel loom. When an additional unit is required and there is no more floor room for it, it is common to place it upon one of the existing units.

On account of lack of space it is becoming more and more necessary to mount upper units upon the ordinary ones at the floor level. As the reason for doing this is the lack of room in a longitudinal direction in a plant, it is obvious that there is little or no room at the end of the plant for the additional paper reels. The ordinary way of mounting the sperimposed unit in parallel relationship to the units of the lower deck has ordinarily suggested nothing but the idea of putting the extra paper reel for the upper deck parallel with the paper reels for the lower deck and at the end of the remote machine. This necessitated the bringing of the web to an upper deck all the way from the end of the press. As these upper decks are naturally put as close as possible to the folding mechanism, this necessitated the guilding of the web throughout substantially the whole length of the press and the crowding of the web supply roll reel for an upper deck into a space entirely inadequate for it. The further expansion of presses in this way necessitates additional units on top of the usual lower level deck.

Figure 1:
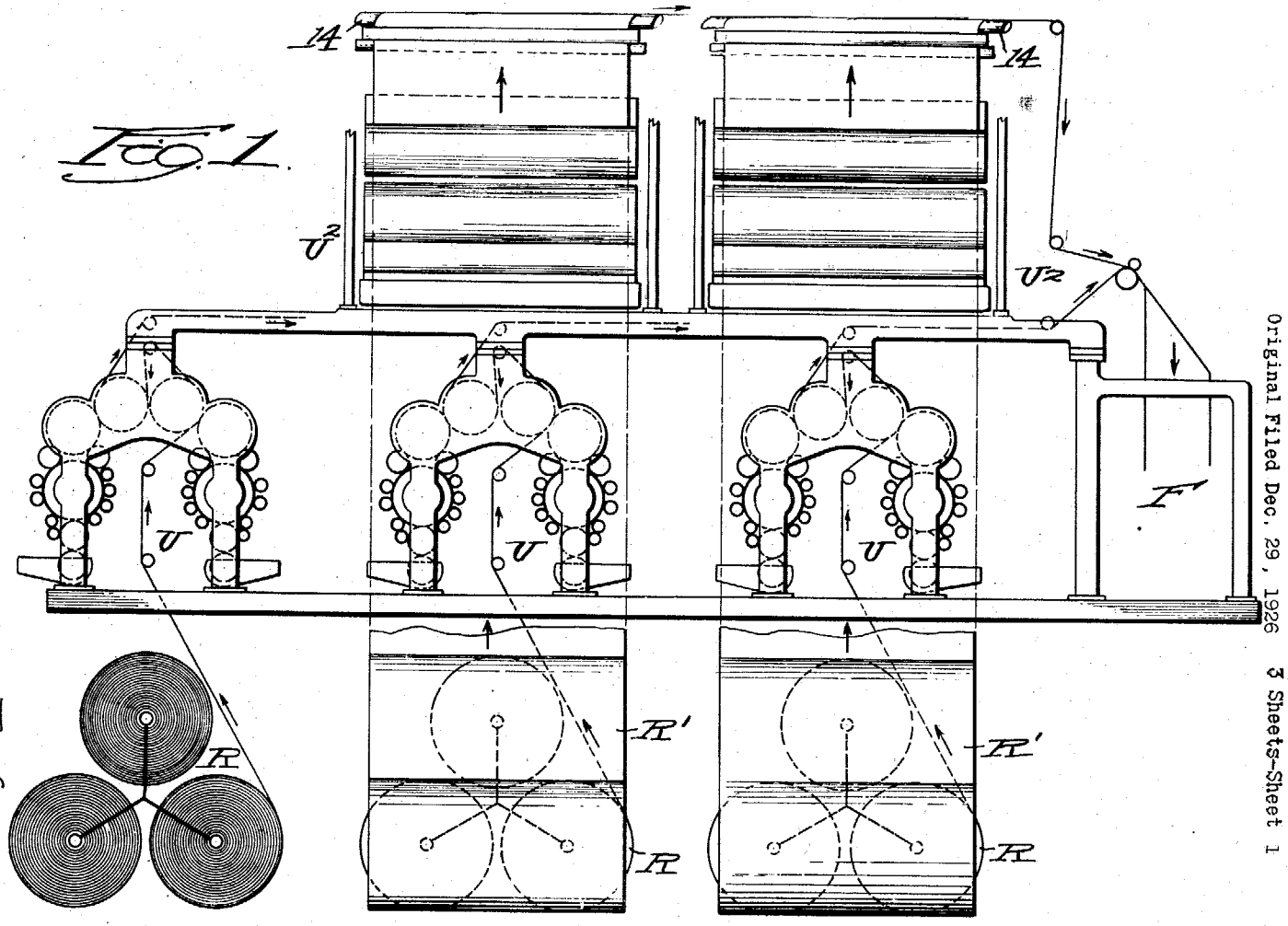
Fig. 1 is a side view of a printing press having a plurality of units located above the lower deck and arranged according to this invention.
Figure 2:
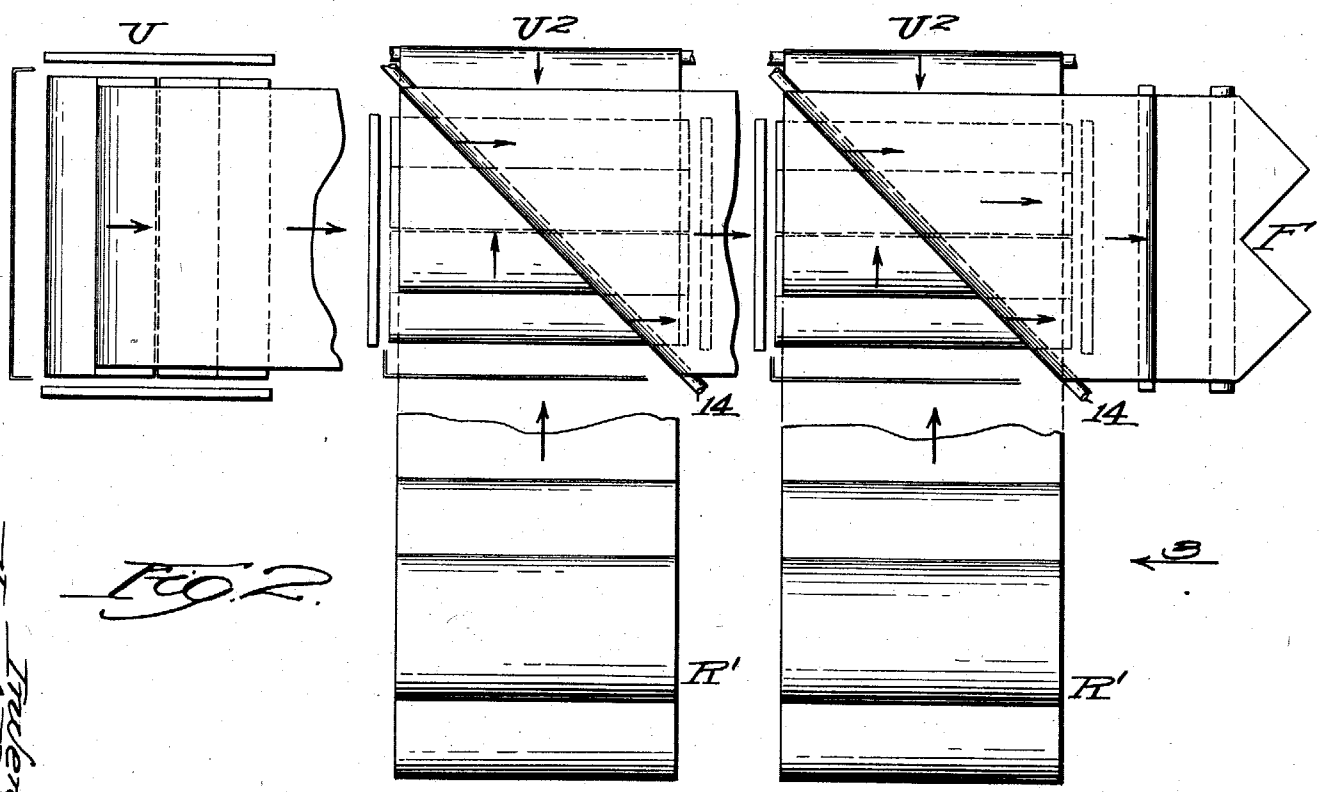
Fig. 2 is a plan of the same.

I have provided a novel arrangement for feeding a plurality of upper decks without carrying the paper all the way through or over the several units and place the web reels within the longitudinal dimension of the plant. In this case, three lower units U are indicated at the floor level, arranged in line as usual, to form the lower deck. The three reels R for carrying the web rolls for supplying the web are indicated in their usual positions. On the frame of the machine above the units U are placed two units $U^2$ of the upper deck. In this case each upper unit $U^2$ is turned around with the axes of its printing couple at right angles to those of the printing units of the lower deck. I have provided a reel R′ for supplying each upper deck $U^2$ at the side of the press with the axes of the rolls arranged longitudinal with respect to the length of the press, or at right angles to the usual construction. This enables me to put these reels, or whatever supports are used, at the side of one of the reels R as shown more clearly in Fig. 2. The web is then run upwardly at the side as indicated in Fig. 3. Each web passes over guide rolls 10 and directly into its unit $U^2$ without being turned. This provides a very simple way of feeding the web. Each web from these reels R′ can be carried up directly at the side without turning and into the units $U^2$ and all the way through them in the simplest manner possible. After passing through the upper units $U^2$, the webs have to be turned over turning bars 14 before being brought into the folder F. These turning bars, of course, bring the upper webs over the other webs and in register with them so that they will go into the folder with them.

This shortens the web path from the running web roll to the upper deck and that without hindering the way in which the web is finally delivered from that unit or deck to the folder. In addition to the fact that it shortens the length of the web path, it, of course, necessitates more space at the side for the extra reel R′. That space, however, is more apt to be available than further space at the end.

It will be understood, of course, that, although I have illustrated and described only a single type of press, this invention is independent of any particular type of newspaper printing press and can be used generally in the newspaper industry. Although I have illustrated and described only one form of the invention I am aware of the fact that modifications can be made therein by any person skilled in the art without departing from the scope of the invention as expressed in the claims. Therefore, I do not wish to be limited to the details of construction herein shown and described, but what I do claim is:—

1. In a newspaper printing machine, the combination with a plurality of units on a level constituting a lower deck, of a plurality of units above them constituting an upper deck, each of the upper deck units being located with its printing and impression cylinders at right angles to the corresponding cylinders of the lower deck.

2. In a newspaper printing machine, the combination with a plurality of units on a level constituting a lower deck of a plurality of units above them constituting an upper deck, each of the upper deck units being located with its printing and impression cylinders at right angles to the corresponding cylinders of the lower deck, means for supporting the web supply rolls for the upper deck with their axes transverse to the axes of the web supply rolls of the lower deck, and means for guiding said web directly into the upper deck to be perfected therein.

3. In a newspaper printing machine, the combination with a printing press comprising a series of units on a level constituting a lower deck and a unit above them located with its printing and impression cylinders at right angles to the corresponding cylinders of the lower deck, means for supporting a web supply roll with its axis transverse to the axis of the web supply rolls of the lower deck, means for guiding said web directly into the upper deck to be perfected therein, and turning bars for turning the web from the upper deck into line with the webs delivered from the lower decks, so that it may be received by a folding mechanism located in the proper position for receiving the webs from the units of the lower deck.

4. In a newspaper printing machine, the combination with a lower deck, of a plurality of units on a level above them constituting an upper deck, the upper deck being located with its printing and impression cylinders at right angles to the corresponding cylinders of the lower deck, means for supporting a web supply roll for the upper deck with its axis transverse to the axes of a web supply roll of the lower deck, and means for guiding said web directly into the upper deck to be perfected therein.

5. In a newspaper printing machine, the combination with a lower deck consisting of a plurality of units and an upper deck having means for receiving a web, printing it, and delivering it to a folding mechanism, of a web supply device for the upper deck located at the side of the press and delivering a web thereto in a plane substantially at right angles to the plane at which the web is delivered to the units of the lower deck, and means associated with the upper deck for turning the web to run in a direction parallel to the path of the webs from the lower deck into the folding mechanism.

In testimony whereof I have hereunto affixed my signature.

HENRY A. WISE WOOD.